United States Patent
Xing

(10) Patent No.: US 10,101,642 B2
(45) Date of Patent: Oct. 16, 2018

(54) HEAT DISSIPATION CONTROLLING METHOD AND APPARATUS FOR LASER PROJECTION EQUIPMENT

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventor: Zhe Xing, Qingdao (CN)

(73) Assignees: HISENSE CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/497,116

(22) Filed: Apr. 25, 2017

(65) Prior Publication Data
US 2018/0143517 A1    May 24, 2018

(30) Foreign Application Priority Data
Nov. 23, 2016   (CN) .......................... 2016 1 1035023

(51) Int. Cl.
*G03B 21/16* (2006.01)
*H01S 3/04* (2006.01)
(Continued)

(52) U.S. Cl.
CPC ................ *G03B 21/16* (2013.01); *H01S 3/04* (2013.01); *G03B 21/2033* (2013.01); *H04N 5/74* (2013.01); *H04N 9/31* (2013.01)

(58) Field of Classification Search
CPC ........ H01S 3/04; G03B 21/2033; H04N 5/74; H04N 9/31
(Continued)

(56) References Cited

U.S. PATENT DOCUMENTS 6,419,364 B2 * 7/2002 Takizawa ............... G03B 21/16
348/748
2007/0261824 A1 * 11/2007 Saegusa ................ G01P 13/006
165/129

FOREIGN PATENT DOCUMENTS

JP          2009069679 A  *  4/2009  .............. F21V 29/02

OTHER PUBLICATIONS

Machine Translation of JP2009069679 A.*

* cited by examiner

*Primary Examiner* — Steven H Whitesell Gordon
*Assistant Examiner* — Jerry Brooks
(74) *Attorney, Agent, or Firm* — J.C. Patents

(57) ABSTRACT

Disclosed embodiments provide a heat dissipation controlling method and an apparatus thereof for a laser projection equipment. The method includes: obtaining an ambient temperature and a compensating value of a rotating speed of a fan when a laser projection equipment is currently powered on; determining a first rotating speed value of the fan of the laser projection equipment according to the ambient temperature and first preset rotating speed information; and determining an initial rotating speed value of the fan for the current power on according to the first rotating speed value and the compensating value; taking the initial rotating speed value as a current rotating speed value; and controlling operation of the fan using the current rotating speed value to dissipate heat from the laser projection equipment. The embodiments of the present disclosure can enable promptly satisfying the demand for heat dissipation when the laser projection equipment is powered on.

8 Claims, 4 Drawing Sheets

(51) Int. Cl.
*G03B 21/20* (2006.01)
*H04N 5/74* (2006.01)
*H04N 9/31* (2006.01)

(58) Field of Classification Search
USPC .................................................. 353/50–60
See application file for complete search history.

HEAT DISSIPATION CONTROLLING METHOD AND APPARATUS FOR LASER PROJECTION EQUIPMENT

CROSS-REFERENCE TO RELATED APPLICATIONS

This application claims priority to Chinese Patent Application No. 201611035023.1, filed on Nov. 23, 2016, entitled "Heat Dissipation Controlling Method and Apparatus for Laser Projection Equipment", which is herein incorporated by reference in its entirety.

TECHNICAL FIELD

Embodiments of the present disclosure relate to electronic technology and, particularly, to a heat dissipation controlling method and a heat dissipation controlling apparatus for a laser projection equipment.

BACKGROUND

Laser projection equipments, which project an image using laser beams, are widely used in home theaters, business meetings, and education conferences, etc.

Considering the heat generated by the laser projection equipment during operation and the impact from ambient temperature on the temperature of the laser projection equipment, high ambient temperature combined with operational heat can lead to over temperature in the laser projection equipment, impacting operational capacity thereof. Hence, the laser projection equipment requires active heat dissipation. To ensure normal operation in various ambient conditions, temperature of the laser projection equipment has to be under control. At present, air cooling is the most used in internal temperature control for laser projection equipments, which involves arranging fans at air inlet and outlet of a laser projection equipment, so that air flow is taken in from the inlet of the laser projection equipment intakes, and fanned out from the outlet, creating an air flow path that provides ventilation to dissipate heat to various internal components in the laser projection equipment, thereby allowing long term stable operation thereof.

When a laser projection equipment is powered on, a rotating speed value for a fan of the laser projection equipment is determined typically according to ambient temperature, and starts the fan at the rotating speed value to dissipate the internal heat of the laser projection equipment.

SUMMARY

Embodiments of the present disclosure provide a heat dissipation controlling method and an apparatus thereof for a laser projection equipment, so as to promptly satisfy the demand for heat dissipation when the laser projection equipment is powered on.

On a first aspect, embodiments of the present disclosure provide a heat dissipation controlling method for a laser projection equipment, including:

obtaining an ambient temperature and a compensating value of a rotating speed of a fan when a laser projection equipment is currently powered on;

determining a first rotating speed value of the fan of the laser projection equipment according to the ambient temperature and first preset rotating speed information; and determining an initial rotating speed value of the fan for the current power on according to the first rotating speed value and the compensating value of the fan of the laser projection equipment; taking the initial rotating speed value as a current rotating speed value; and controlling operation of the fan using the current rotating speed value to dissipate heat from the laser projection equipment.

On a second aspect, embodiments of the present disclosure provide a heat dissipation controlling apparatus for a laser projection equipment, including:

an obtaining module, configured to obtain an ambient temperature and a compensating value of a rotating speed of a fan when a laser projection equipment is currently powered on;

a processing module, configured to determine a first rotating speed value of the fan of the laser projection equipment according to the ambient temperature and first preset rotating speed information; and the processing module is further configured to determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

On a third aspect, embodiments of the present disclosure further provide a heat dissipation controlling apparatus for a laser projection equipment, including:

a memory, a communication port and a processor, wherein the memory stores instructions, the processor is coupled with the memory and is configured to execute the instructions stored in the memory, and the processor is configured to:

obtain an ambient temperature and a compensating value of a rotating speed of a fan when a laser projection equipment is currently powered on;

determine a first rotating speed value of the fan of the laser projection equipment according to the ambient temperature and first preset rotating speed information; and determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

BRIEF DESCRIPTION OF DRAWINGS

To describe technical solutions in embodiments of the present disclosure or the related art more clearly, the following briefly describes the accompanying drawings required in the description of embodiments or the prior art. Apparently, the accompanying drawings illustrate only some exemplary embodiments of the present disclosure, and those skilled in the art can derive other drawings from these drawings without creative efforts.

DETAILED DESCRIPTION

In order to make objectives, technical solutions and advantages of embodiments of the present disclosure clearer, the technical solutions in the embodiments of the present disclosure will be described hereunder clearly and completely with reference to accompanying drawings. Obviously, the described embodiments are only a part of embodiments of the present disclosure, rather than all of them. Any and all other embodiments obtained by persons of ordinary skill in the art based on the presently embodiments of the present disclosure without making any creative effort shall fall into the protection scope of the present disclosure.

Figure 1:
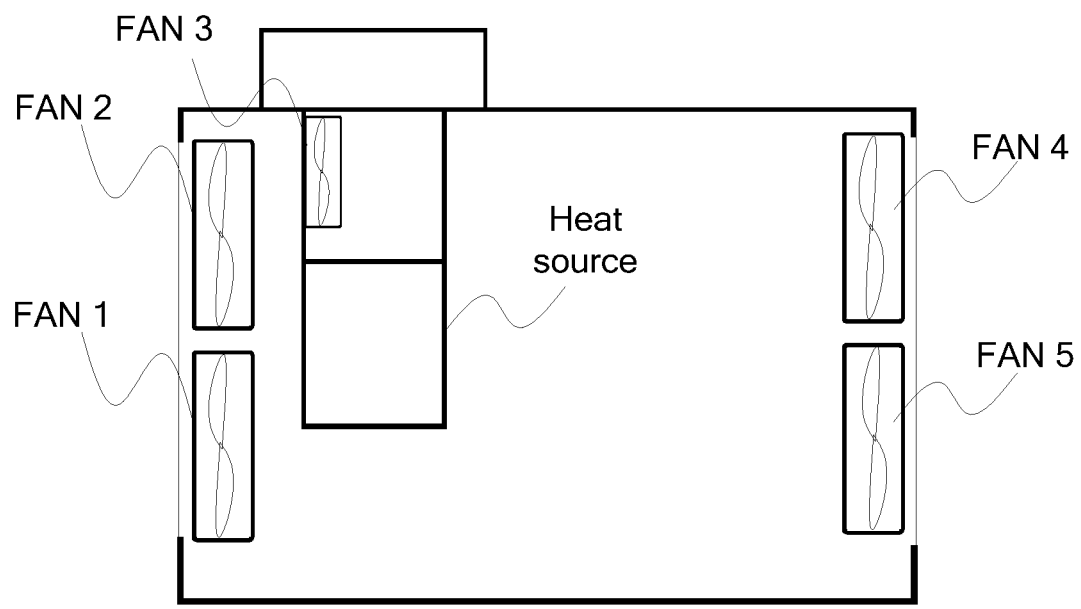
FIG. 1 is a simplified structural schematic illustrating a laser projection equipment.

FIG. 1 is a simplified structural schematic illustrating a laser projection equipment. As depicted in FIG. 1, two fans are arranged at an air inlet of the laser projection equipment and two fans are arranged at an air outlet of the laser projection equipment, respectively, where FAN 1 and FAN 2 are at the air inlet, and FAN 4 and FAN 5 are at the air outlet. These four fans are primary fans for the laser projection equipment, and are used for dissipating heat from internal components thereof, in order to ensure long term stable operation of the laser projection equipment. FAN 3 is a supplementary fan that can be flexibly deployed as needed. Of course, it is understandable that FIG. 1 is merely an illustrative schematic diagram, in which other components of laser projection equipment are not depicted, and various laser projection equipments can also be flexible, when needed, with respect to the number and location of the heat dissipating fans. As an illustrative example, the heat source of the laser projection equipment may be arranged at a location same as, or different from that depicted in FIG. 1. During operation of the laser projection equipment, the heat source generates heat, pushing up the internal temperature in the laser projection equipment, which requires the four fans to ventilate and dissipate the internal heat. The heat source may be, in particular, a laser generator, i.e. the light emitting source of the laser projection equipment, or other types of elements. Being a core component of the laser projection equipment, operation of the laser generator has direct impact on the reliable operation of the laser projection equipment. Therefore, heat dissipating capacity of the laser projection equipment shall be sufficient for the laser generator. It should be further noted that, the heat dissipation need of the laser projection equipment can be determined according to a temperature of the laser generator or an average temperature of the entire inside space of the laser projection equipment, allowing flexible configuration according to the need. The heat dissipation controlling method for a laser projection equipment in this embodiments of the present disclosure can dynamically adjust a rotating speed of the fan according to the heat dissipation need of the laser projection equipment to meet the heat dissipation need of the components therein. The heat dissipation controlling method for a laser projection equipment in the embodiments of the present disclosure can be carried out by a mainboard of the laser projection equipment, and explanations for the following embodiments can be referred to for the particular implementation.

Figure 2:
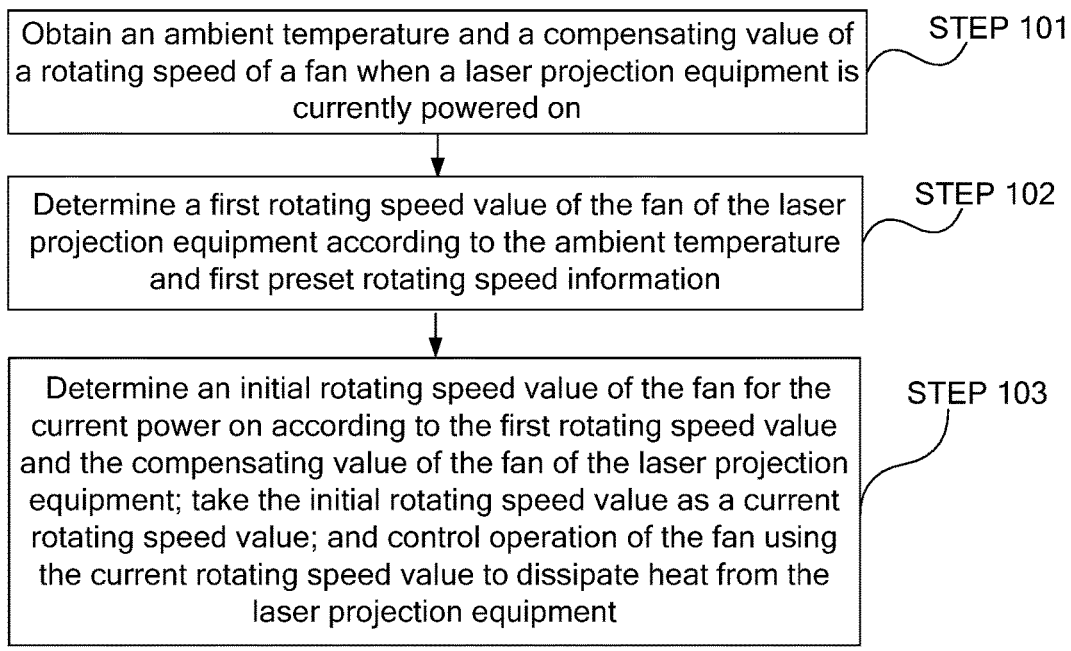
FIG. 2 is a flow chart illustrating a heat dissipation controlling method for a laser projection equipment according to some embodiments of the present disclosure.

FIG. 2 is a flow chart illustrating a heat dissipation controlling method for a laser projection equipment according to some embodiments of the present disclosure. As depicted in FIG. 2, the method may include:

STEP 101: obtain an ambient temperature and a compensating value of a rotating speed of a fan when a laser projection equipment is currently powered on.

The inventor of this disclosure discovers, after long term research, that dust will build up on dust screens arranged at the air inlet and the air outlet of the laser projection equipment after extended use, which degrade ventilation performance of the laser projection equipment. Hence, if the fan rotates at rotating speed which is determined merely according to the ambient temperature when the laser projection equipment is powered on, the ventilation air thus provided will, more often than not, fail to reach the flow actually required to dissipate heat from the laser projection equipment in such ambient temperature, thus failing to fulfill the heat dissipation demand of a laser projection equipment after long term use.

In some embodiments of the present disclosure, a temperature sensor may be arranged at the air inlet of the laser projection equipment to detect the ambient temperature, to obtain the ambient temperature when the laser projection equipment is currently powered on. The phrases "currently powered on" and "current power on" mean, in particular, the laser projection equipment is switched from a non-operational state into an operational state, and "lastly powered off" and "last power off" mean, in particular, the last time, which is immediately before the current power on, the laser projection equipment is switched from an operational state into a non-operational state. The compensating value of the rotating speed of the fan can reflect the ventilation performance before the laser projection equipment was lastly powered off. A larger compensating value indicates poorer laser projection equipment ventilation performance, where a poor ventilation performance means there is a relatively large gap between the actual flow internally passing through the laser projection equipment and the theoretical flow corresponding to the rotating speed value when the fan operates at the predefined rotating speed value. The smaller the compensating value is, the better the ventilation performance of the laser projection equipment, where a good ventilation performance means there is only insignificant gap between the actual flow inside the laser projection equipment when the fan operates at predefined rotating speed value and the theoretical flow expected of the rotating speed value. A zero compensating value indicates that the actual flow inside the laser projection equipment when the fan operates at predefined rotating speed value equals to the theoretical flow expected of the rotating speed value.

STEP 102: determine a first rotating speed value of the fan of the laser projection equipment according to the ambient temperature and first preset rotating speed information.

STEP 103: determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

Illustratively, the initial rotating speed value of the fan when the laser projection equipment is currently powered on is determined according to the first rotating speed value and the compensating value. That is, the initial rotating speed value is determined by combining the ambient temperature and the ventilation performance before the laser projection equipment was lastly powered off. In an optional implementation, the initial rotating speed value may be obtained by adding the compensating value on the basis of the first rotating speed value. In some embodiments of the present disclosure, different weights may be assigned to the first rotating speed value and the compensating value, both of which can be added together after being respectively multiplied by their respective weight.

This embodiment obtains an ambient temperature and a compensating value of a rotating speed of a fan when a laser projection equipment is currently powered on, determines a first rotating speed value of the fan of the laser projection equipment according to the ambient temperature and first preset rotating speed information, determines an initial rotating speed value of the fan for the current power on according to the first rotating speed value of the fan of the laser projection equipment and the compensating value, takes the initial rotating speed value as a current rotating speed value, and controls operation of the fan using the current rotating speed value to dissipate heat from the laser projection equipment. Since the compensating value of the rotating speed of the fan is used for reflecting the ventilation performance before the laser projection equipment was lastly powered off, the flow required by the laser projection equipment in such ambient temperature can be achieved by a fan rotating at an initial rotating speed value which is determined according to the ambient temperature and the compensating value. Thus, heat dissipation requirement can be promptly fulfilled when the laser projection equipment is powered on.

It should be noted that the compensating value of the rotating speed of the fan can reflect the ventilation performance before the laser projection equipment was lastly powered off. A number of factors can contribute to the ventilation performance inside the laser projection equipment. For example, dust will build up on the dust screen arranged on the laser projection equipment as the equipment continues in its service, causing the dust screens to reduce the air flow. For another example, the fan in the laser projection equipment will deteriorate in performance as their service life passes, falling short of providing expected flow, which can negatively affect the ventilation. For yet another example, the surroundings of the laser projection equipment, e.g. possible obstructions at the inlet or outlet of the laser projection equipment, can also hamper ventilation. There are, of course, many other factors, which will not be exhausted herein. Regardless of the specific factor, the embodiment of the present disclosure can always utilize the compensating value to adjust the rotating speed of the fan, meeting up with the need of the laser projection equipment for heat dissipation.

Using a projection equipment provided with a dust screen as an illustration, dust will build up on the dust screen as time passes, which leads to shrinking screen holes, hampering the fan ventilation of the projection equipment, and in turn negatively impacting heat dissipation for the projection equipment. If the initial rotating speed value of the fan is determined merely according to the ambient temperature, the cooling capacity provided by a fan rotating at this initial rotating speed value will, considering the impact from the dust screen, fall behind the expected heat dissipation effect. Instead, according to the heat dissipation controlling method of the embodiment of the present disclosure, when the laser projection equipment is powered on, the initial rotating speed value of the fan for the current power on is determined based on the ambient temperature and the compensating value, thereby allowing the rotating speed of the fan to promptly satisfy the heat dissipation required when the laser projection equipment is started.

Figure 3:
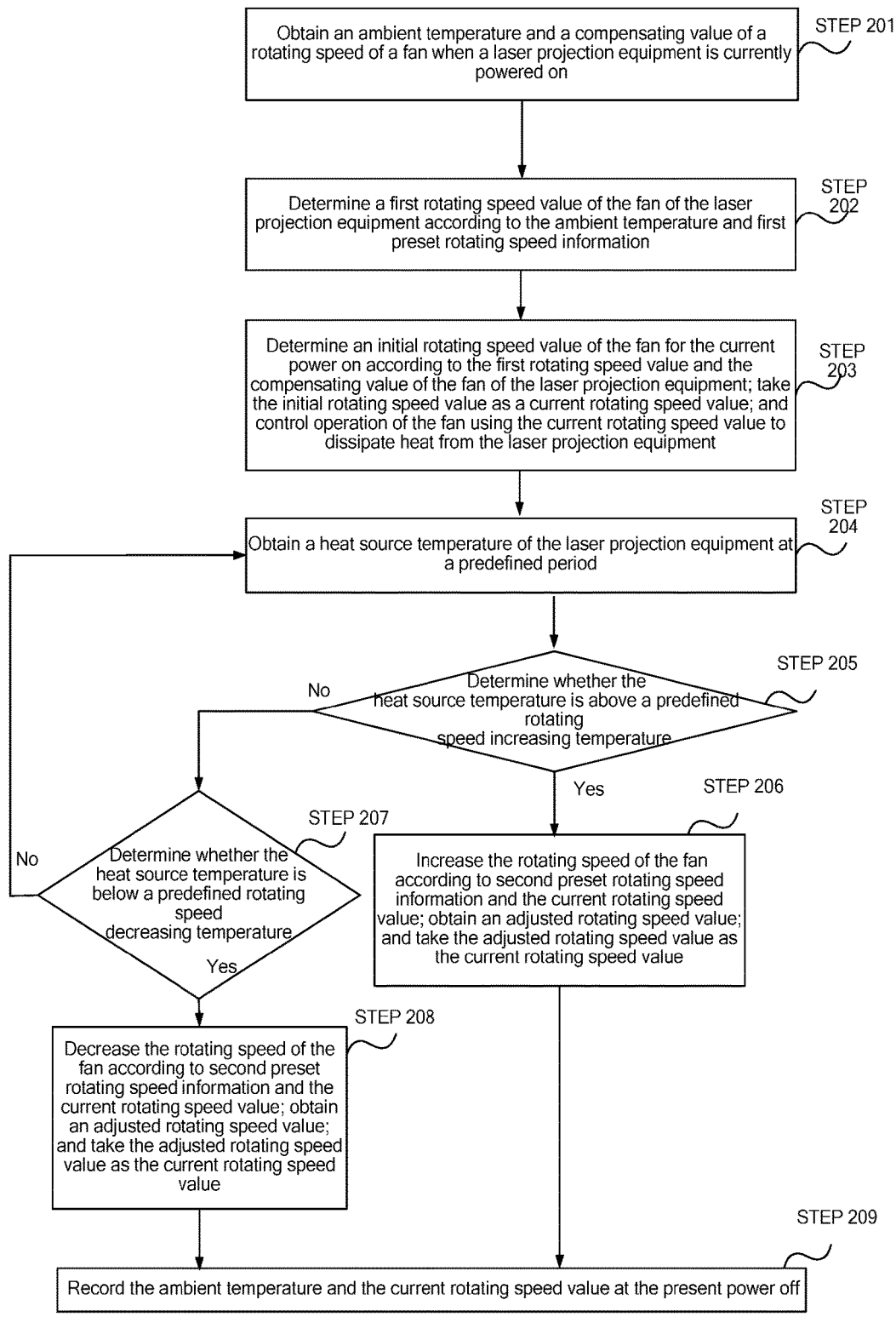
FIG. 3 is a flow chart illustrating a heat dissipation controlling method for a laser projection equipment according to some other embodiments of the present disclosure.

As another optional implementation, reference is now made to FIG. 3, which is a flow chart illustrating a heat dissipation controlling method for a laser projection equipment according to some other embodiments of the present disclosure. As depicted in FIG. 3, the method may include:

STEP 201: obtain an ambient temperature and a compensating value of a rotating speed of a fan when a laser projection equipment is currently powered on.

Illustratively, the compensating value of the rotating speed of the fan is, in particular, determined according to an actual rotating speed value of the fan when the laser projection equipment was lastly powered off and a predefined rotating speed value of the fan corresponding to an ambient temperature at the time of the last power off. In some embodiments of the present disclosure, the compensating value may be the difference between these two.

STEP 202: determine a first rotating speed value of the fan of the laser projection equipment according to the ambient temperature and first preset rotating speed information.

Illustratively, the first preset rotating speed information may particularly include an ambient temperature range and a rotating speed level associated with the ambient temperature range, where the rotating speed level is associated with a predefined rotating speed value of at least one fan. The first preset rotating speed information may particularly be a table which registers multiple ambient temperature ranges and rotating speed levels associated with each of the ambient temperature ranges, where one rotating speed level is associated with predefined rotating speed values of multiple fans. Illustratively, in the first preset rotating speed information, the ambient temperature may be matched to predefined rotating speed values of multiple fans, and the predefined rotating speed values are taken as the first rotating speed value.

STEP 203: determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

For the implementation for STEP 203, reference can be made to descriptions for the STEP 103, which will not be repeated herein.

STEP 204: obtain a heat source temperature of the laser projection equipment at a predefined period.

STEP 205: determine whether the heat source temperature is above a predefined rotating speed increasing temperature, and execute STEP 206 if yes, otherwise execute STEP 207.

STEP 206: increase the rotating speed of the fan according to second preset rotating speed information and the current rotating speed value; obtain an adjusted rotating speed value; take the adjusted rotating speed value as the current rotating speed value; and execute STEP 204.

Illustratively, the second preset rotating speed information may particularly include: multiple rotating speed levels, and predefined rotating speed values of multiple fans associated with each rotating speed level. The first preset rotating speed information may be a subset of the second preset rotating speed information.

The increasing the rotating speed of the fan can be particularly implemented by: increasing by one rotating speed level on the basis of the rotating speed level associated with the current rotating speed value; and taking the predefined rotating speed value associated with the increased by one rotating speed level as the adjusted rotating speed value. It should be noted that, if the current rotating speed value has already been the rotating speed value associated with the maximum rotating speed level when STEP 206 is executed, the rotating speed level will not be increased any further, and this current rotating speed value will be used for controlling the rotation of the fan.

STEP 207: determine whether the heat source temperature is below a predefined rotating speed decreasing temperature, and execute STEP 208 if yes, otherwise execute STEP 204.

STEP 208: decrease the rotating speed of the fan according to second preset rotating speed information and the current rotating speed value; obtain an adjusted rotating speed value; take the adjusted rotating speed value as the current rotating speed value; and execute STEP 204.

The decreasing the rotating speed of the fan can be particularly implemented by: decreasing by one rotating speed level on the basis of the rotating speed level associated with the current rotating speed value; and taking the predefined rotating speed value associated with the decreased by one rotating speed level as the adjusted rotating speed value. It should be noted that, if the current rotating speed value has already been the rotating speed value associated with the minimum rotating speed level when STEP 208 is executed, the rotating speed level will not be decrease any further, and this current rotating speed value will be used for controlling the rotation of the fan.

STEP 209: record the ambient temperature and the current rotating speed value at the present power off.

The STEP 209 is designed to assist in determining the compensating value of the rotating speed of the fan next time the equipment is powered on. Illustratively, if the current rotating speed value is the same as the actual rotating speed value of the laser projection equipment before the present power off, the compensating value of the rotating speed of the fan next time the equipment is powered on can be determined according to the actual rotating speed value and the predefined rotating speed value of the fan corresponding to the ambient temperature. The predefined rotating speed value of the fan corresponding to the ambient temperature can be determined according to the ambient temperature and the first preset rotating speed information.

In some embodiments of the present disclosure, a heat source limiting temperature and an ambient limiting temperature may further be provided. In this case, the method further includes: determining whether the heat source temperature is above the heat source limiting temperature; and if yes, executing any one or a combination of powering off operation, dimming operation and notice displaying operation. It should be noted that the step of determining whether the heat source temperature is above the heat source limiting temperature may in particular be executed after the STEP 204. The method further includes: obtaining an ambient temperature of the laser projection equipment at a predefined period; determining whether the ambient temperature is above the ambient limiting temperature; and if yes, executing any one or a combination of powering off operation, dimming operation and notice displaying operation. It should be noted that the step of obtaining an ambient temperature of the laser projection equipment at a predefined period can be executed before or after the STEP 204.

As another optional implementation, two temperature detecting points (Tm_A and Tm_B) may be provided to detect the temperature of the heat source. The two temperature detecting points may be located on two sides of the heat source. A further temperature detecting point may be arranged at the air inlet for detecting the ambient temperature. As seen in the five fans depicted in FIG. 1, the first preset rotating speed information may particularly be Table 1, and the second preset rotating speed information may particularly be Table 2. Each row in the first preset rotating speed information and second preset rotating speed information is associated with one rotating speed level, and each rotating speed level is associated with predefined rotating speed values for the five fans.

TABLE 1

| First preset rotating speed information | | | | | |
|---|---|---|---|---|---|
| | Ambient Temperature Range | | | | |
| Fan name | 0~25° C. | 26~30° C. | 31~35° C. | 36~40° C. | >40° C. |
| FAN 1 | 1200 | 1350 | 1600 | 1800 | 2600 |
| FAN 2 | 1200 | 1350 | 1600 | 1800 | 2600 |
| FAN 3 | 1200 | 1350 | 1600 | 1800 | 2700 |
| FAN 4 | 1000 | 1150 | 1200 | 1400 | 2100 |
| FAN 5 | 1000 | 1150 | 1200 | 1400 | 2100 |

TABLE 2

| Second preset rotating speed information | | | | | | |
|---|---|---|---|---|---|---|
| rotating speed increasing Tm_A | 62 | 62 | 62 | 62 | 62 | 62 |
| rotating speed decreasing Tm_A | | 57 | 57 | 57 | 57 | 57 | 57 |
| rotating speed increasing Tm_B | 62 | 62 | 62 | 62 | 62 | 62 |
| rotating speed decreasing Tm_B | | 57 | 57 | 57 | 57 | 57 | 57 |
| FAN 1 | 1200 | 1350 | 1600 | 1800 | 2000 | 2200 | 2600 |
| FAN 2 | 1200 | 1350 | 1600 | 1800 | 2000 | 2200 | 2600 |
| FAN 3 | 1200 | 1350 | 1600 | 1800 | 2000 | 2200 | 2700 |
| FAN 4 | 1000 | 1150 | 1300 | 1400 | 1500 | 1600 | 2100 |
| FAN 5 | 1000 | 1150 | 1300 | 1400 | 1500 | 1600 | 2100 |

When a laser projection equipment is powered on for the first time, ambient temperature at its air inlet is firstly detected. Assuming the ambient temperature to be 20□, the ambient temperature at the air inlet and the Table 1 are used for determining the rotating speeds of the fans at the time of the current power on. By looking for a match in the Table 1, the rotating speeds of FAN 1 to FAN 5 are, respectively, Nf1=1200, Nf2=1200, Nf3=1200, Nf4=1000 and Nf5=1000. Once each 60 seconds during the operation of the laser projection equipment, temperatures are taken at the two temperature detecting points (Tm_A and Tm_B), and ambient temperature is taken at the air inlet. According to the temperatures took at the two temperature detecting points (Tm_A and Tm_B) and the temperature took at the air inlet, rotating speeds of the fans in operation state are controlled. Illustratively, when temperature at the Tm_A or Tm_B rises to 62° C., and remains to be ≥62° C. after 30 seconds, the fans are up-shifted by one level, i.e. the rotating speed level is increased by one. At this time, a timer is started, and the monitoring continues. Each time a period of 60 seconds elapses, if the temperature at the Tm_A or Tm_B goes on to be ≥62° C., the rotating speeds will be increased further, i.e. the rotating speed level is again increased by one, until the maximum rotating speed level is reached. If the temperature at the Tm_A and Tm_B becomes <62° C., the rotating speed level increasing is stopped. When temperatures at Tm_A and Tm_B drop to 57° C., and remain to be ≤57° C. after 180 s, the fans are down-shifted by one level, i.e. the rotating speed level is decreased by one. At this time, a timer is started, and the monitoring continues. Each time a period of 180 seconds elapses, if temperatures at Tm_A and Tm_B go on to be ≤57° C., the rotating speed will be decreased further, until the minimum rotating speed level is reached. If temperatures at Tm_A and Tm_B becomes >57° C., the rotating speed level decreasing is stopped.

Assuming the ambient temperature to be 24° C. before a power off, and rotating speeds of FAN 1 to FAN 5 are Nf1=1600, Nf2=1600, Nf3=1600, Nf4=1200 and Nf5=1200, respectively, and compensating values of FAN 1 to FAN 5 are ΔN1=ΔN2=ΔN3=400 and ΔN4=ΔN5=200, respectively.

At the next power on, the ambient temperature is 27° C., which corresponds to the 26-30° C. range in Table 1, hence Nf1'=Nf2'=Nf3'=1350+400=1750, Nf4'=Nf5'=1150+200=1350, and powering on while up-shifting one level is selected, i.e. start at the fourth level, with Nf1=1800, Nf2=1800, Nf3=1800, Nf4=1400 and Nf5=1400.

For every one minute after the power on, temperatures are taken at both temperature detecting points (Tm_A and Tm_B), and ambient temperature is taken at the air inlet. According to these temperatures, rotating speeds of the operating fans are determined such that: when temperature at the Tm_A or Tm_B rises to 62° C., and remains to be ≥62° C. after 30 seconds, the fans are up-shifted by one level, i.e. the rotating speed level is increased by one. At this time, a timer is started, and the monitoring continues. Each time a period of 60 seconds elapses, if temperature at Tm_A or Tm_B goes on to be ≥62° C., the rotating speed will be increased further, until the maximum rotating speed level is reached. If temperature at Tm_A and Tm_B becomes <62° C., the rotating speed level increasing is stopped. When temperatures at Tm_A and Tm_B drop to 57° C., and remain to be ≤57° C. after 180 s, the rotating speeds of the fans are down-shifted by one level. At this time, a timer is started, and the monitoring continues. Each time a period of 180 seconds elapses, if temperatures at Tm_A and Tm_B go on to be ≤57° C., the rotating speeds will be decreased further, until the minimum rotating speed is reached. If temperatures at Tm_A and Tm_B become >57° C., the rotating speed level decreasing is stopped.

Since the compensating value of the rotating speed of the fan is particularly determined according to an actual rotating speed value of the fan when the laser projection equipment was lastly powered off and a predefined rotating speed value of the fan corresponding to an ambient temperature at the time of the last power off, it follows naturally that the compensating value is configured according to the actual operational condition of the laser projection equipment, and the initial rotating speed value determined according to this compensating value is the rotating speed value associated with the minimum air flow required by the laser projection equipment for dissipating its heat. Therefore, while the heat dissipation required is promptly satisfied when the laser projection equipment is powered on, fan operation load is also effectively controlled, in turn effectively controlling operation noise of the fans in the laser projection equipment.

During operation of the laser projection equipment, heat source temperature of the laser projection equipment is obtained at predefined intervals, and the rotating speed of the fan is shifted up or down according to the heat source temperature and the current rotating speed value, thereby dynamically adjusting the rotating speed of the fan to fulfill the heat dissipation requirement when the laser projection equipment is powered on and/or operating.

Figure 4:
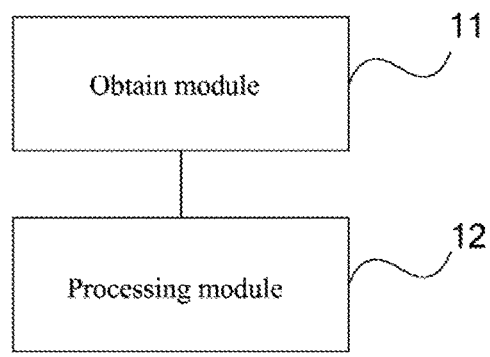
FIG. 4 is a schematic structural diagram illustrating a heat dissipation controlling apparatus for a laser projection equipment according to some embodiments of the present disclosure.

FIG. 4 is a schematic structural diagram illustrating a heat dissipation controlling apparatus for a laser projection equipment according to some embodiments of the present disclosure. As depicted in FIG. 4, the disclosed heat dissipation controlling apparatus for a laser projection equipment may include: an obtaining module 11 and a processing module 12, where the obtaining module 11 is configured to obtain an ambient temperature and a compensating value of a rotating speed of a fan when a laser projection equipment is currently powered on. The processing module 12 is configured to determine a first rotating speed value of the fan of the laser projection equipment according to the ambient temperature and first preset rotating speed information. The processing module 12 is further configured to determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

The processing module 12 is further configured to: obtain a heat source temperature of the laser projection equipment at a predefined period as STEP 1; determine whether the heat source temperature is above a predefined rotating speed increasing temperature as STEP 2, and execute STEP 3 if yes, otherwise execute STEP 4; increase the rotating speed of the fan according to second preset rotating speed information and the current rotating speed value, obtain an adjusted rotating speed value, and take the adjusted rotating speed value as the current rotating speed value as STEP 3, and execute STEP 1; determine whether the heat source temperature is below a predefined rotating speed decreasing temperature as STEP 4, and execute STEP 5 if yes, otherwise execute STEP 1; decrease the rotating speed of the fan according to second preset rotating speed information and the current rotating speed value, obtain an adjusted rotating speed value, and take the adjusted rotating speed value as the current rotating speed value as STEP 5, and execute STEP 1.

The first preset rotating speed information may include an ambient temperature range and a rotating speed level associated with the ambient temperature range, where the rotating speed level is associated with predefined rotating speed values of multiple fans.

The processing module 12 is configured to determine a first rotating speed value for a fan of the laser projection equipment according to the ambient temperature and first preset rotating speed information, which may particularly include: determine, according to the ambient temperature and the first preset rotating speed information, an ambient temperature range to which the ambient temperature belongs, and obtaining a rotating speed level associated with the ambient temperature range to which the ambient temperature belongs; and obtain, according to the obtained rotating speed level, a first rotating speed value associated with the obtained rotating speed level for multiple fans of the laser projection equipment.

The second preset rotating speed information includes multiple rotating speed levels, and predefined rotating speed values of multiple fans associated with each rotating speed level.

The compensating value is determined according to an actual rotating speed value of the fan when the laser projection equipment was lastly powered off and a predefined rotating speed value of the fan corresponding to an ambient temperature when the laser projection equipment was lastly powered off.

An apparatus of this embodiment may be configured to perform the technical solutions of the embodiment methods described above, following similar principals and producing similar technical effects, neither of which will be repeated herein.

Figure 5:
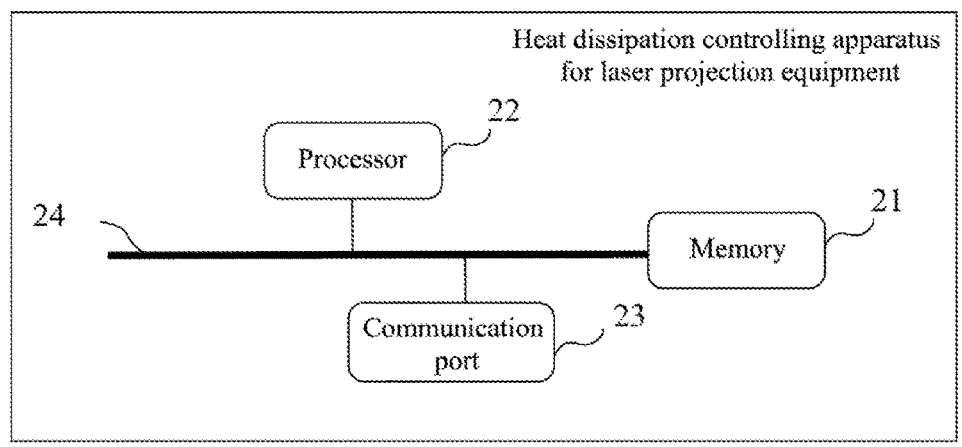
FIG. 5 is a schematic structural diagram illustrating a heat dissipation controlling apparatus for a laser projection equipment according to some other embodiments of the present disclosure.

FIG. 5 is a schematic structural diagram illustrating a heat dissipation controlling apparatus for a laser projection equipment according to some other embodiments of the present disclosure. As depicted in FIG. 5, the apparatus of this embodiment may include a memory 21, a processor 22, a communication port 23, and a communication bus 24. The memory 21 is configured to store application instructions, the processor 22 is coupled to the memory 21, and the communication bus 24 is configured to realize communication connections between the parts. The processor 22 is configured to execute the instructions stored in the memory 21, and the processor 22 is configured to:

obtain an ambient temperature and a compensating value of a rotating speed of a fan when a laser projection equipment is currently powered on;

determine a first rotating speed value of the fan of the laser projection equipment according to the ambient temperature and first preset rotating speed information; and the processor 22 is further configured to determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

In some embodiments of the present disclosure, the memory 21 may be any component capable of storing programming and/or instructions for the processor 22, for example, the memory 21 comprise any type of non-transitory memory such as static random access memory (SRAM), dynamic random access memory (DRAM), synchronous DRAM (SDRAM), read-only memory (ROM), a combination thereof, or the like.

In some embodiments of the present disclosure, the processor 22 is further configured to:

STEP 1: obtain a heat source temperature of the laser projection equipment at a predefined period;

STEP 2: determine whether the heat source temperature is above a predefined rotating speed increasing temperature, and execute STEP 3 if yes, otherwise execute STEP 4;

STEP 3: increase the rotating speed of the fan according to second preset rotating speed information and the current rotating speed value; obtain an adjusted rotating speed value; take the adjusted rotating speed value as the current rotating speed value; and execute STEP 1;

STEP 4: determine whether the heat source temperature is below a predefined rotating speed decreasing temperature, and execute STEP 5 if yes, otherwise execute STEP 1; and STEP 5: decrease the rotating speed of the fan according to second preset rotating speed information and the current rotating speed value; obtain an adjusted rotating speed value; take the adjusted rotating speed value as the current rotating speed value; and execute STEP 1.

In some embodiments of the present disclosure, the processor 22 is further configured to:

obtain a heat source temperature of the laser projection equipment at a predefined period;

when the heat source temperature is above a predefined rotating speed increasing temperature, increase the rotating speed of the fan according to second preset rotating speed information and the current rotating speed value; obtain an adjusted rotating speed value; and take the adjusted rotating speed value as the current rotating speed value;

or when the heat source temperature is below a predefined rotating speed decreasing temperature, decrease the rotating speed of the fan according to the second preset rotating speed information and the current rotating speed value; obtain an adjusted rotating speed value; and take the adjusted rotating speed value as the current rotating speed value.

In some embodiments of the present disclosure, the first preset rotating speed information may include an ambient temperature range and a rotating speed level associated with the ambient temperature range, where the rotating speed level is associated with predefined rotating speed values of multiple fans.

The processor 22 is configured to determine the first rotating speed value of the fan of the laser projection equipment according to the ambient temperature and first preset rotating speed information, comprising:

determine, according to the ambient temperature and the first preset rotating speed information, an ambient temperature range to which the ambient temperature belongs, and obtain a rotating speed level associated with the ambient temperature range to which the ambient temperature belongs; and obtain, according to the obtained rotating speed level, a first rotating speed value associated with the obtained rotating speed level for multiple fans of the laser projection equipment.

In some embodiments of the present disclosure, the second preset rotating speed information includes multiple rotating speed levels, and predefined rotating speed values of multiple fans associated with each rotating speed level.

In some embodiments of the present disclosure, the compensating value is determined according to an actual rotating speed value of the fan when the laser projection equipment was lastly powered off and a predefined rotating speed value of the fan corresponding to an ambient temperature when the laser projection equipment was lastly powered off.

An apparatus of this embodiment may be configured to perform the technical solutions of the embodiment methods described above, following similar principals and producing similar technical effects, neither of which will be repeated herein.

Persons of ordinary skill in the art may understand that, all or a part of steps of the foregoing method embodiments may be implemented by a program instructing relevant hardware. The foregoing program may be stored in a computer readable storage medium. When the program runs, the steps of the foregoing embodiment methods are performed. The foregoing storage medium includes various mediums capable of storing program codes, such as a ROM, a RAM, a magnetic disk, or an optical disc.

Finally, it should be noted that the foregoing embodiments are merely intended for describing, rather than limiting, the technical solutions of the present disclosure. Although the present disclosure is described in detail with reference to the foregoing embodiments, persons of ordinary skill in the art should understand that it remains possible to make modifications to the technical solutions described in the foregoing embodiments, or make equivalent replacements to some or all technical features therein. However, these modifications or replacements do not make the essence of corresponding technical solutions depart from the scope of the technical solutions in the embodiments of the present disclosure.

What is claimed is:

1. A heat dissipation controlling method for a laser projection equipment, comprising:
   obtaining an ambient temperature and a compensating value of a rotating speed of a fan when a laser projection equipment is currently powered on, wherein the compensating value is determined according to an actual rotating speed value of the fan when the laser projection equipment was lastly powered off and a predefined rotating speed value of the fan corresponding to an ambient temperature when the laser projection equipment was lastly powered off;
   determining a first rotating speed value of the fan of the laser projection equipment according to the ambient temperature and first preset rotating speed information; and
   determining an initial rotating speed value of the fan for the current power on according to the first rotating speed value and the compensating value of the fan of the laser projection equipment; taking the initial rotating speed value as a current rotating speed value; and controlling operation of the fan using the current rotating speed value to dissipate heat from the laser projection equipment.

2. The method according to claim 1, wherein the first preset rotating speed information comprises: an ambient temperature range and a rotating speed level associated with the ambient temperature range, wherein the rotating speed level is associated with a predefined rotating speed value of at least one fan; and
   the determining the first rotating speed value of the fan of the laser projection equipment according to the ambient temperature and first preset rotating speed information comprises:
   determining, according to the ambient temperature and the first preset rotating speed information, an ambient temperature range to which the ambient temperature belongs, and obtaining a rotating speed level associated with the ambient temperature range to which the ambient temperature belongs; and
   obtaining, according to the obtained rotating speed level, the first rotating speed value associated with the obtained rotating speed level for at least one fan of the laser projection equipment.

3. The method according to claim 1, further comprising:
   obtaining a heat source temperature of the laser projection equipment at a predefined period;
   when the heat source temperature is above a predefined rotating speed increasing temperature, increasing the rotating speed of the fan according to second preset rotating speed information and the current rotating speed value; obtaining an adjusted rotating speed value; and taking the adjusted rotating speed value as the current rotating speed value;
   or when the heat source temperature is below a predefined rotating speed decreasing temperature, decreasing the rotating speed of the fan according to the second preset rotating speed information and the current rotating speed value; obtaining an adjusted rotating speed value; and taking the adjusted rotating speed value as the current rotating speed value.

4. The method according to claim 3, wherein the second preset rotating speed information comprises: multiple rotating speed levels, and predefined rotating speed values of multiple fans associated with each rotating speed level.

5. A heat dissipation controlling apparatus for a laser projection equipment, comprising:
   a memory, a communication port and a processor, wherein the memory stores instructions, the processor is coupled with the memory and is configured to execute the instructions stored in the memory, and the processor is configured to:
   obtain an ambient temperature and a compensating value of a rotating speed of a fan when a laser projection equipment is currently powered on, wherein the compensating value is determined according to an actual rotating speed value of the fan when the laser projection equipment was lastly powered off and a predefined rotating speed value of the fan corresponding to an ambient temperature when the laser projection equipment was lastly powered off;
   determine a first rotating speed value of the fan of the laser projection equipment according to the ambient temperature and first preset rotating speed information; and
   determine an initial rotating speed value of the fan for the current power on according to the first rotating speed value and the compensating value of the fan of the laser projection equipment; take the initial rotating speed value as a current rotating speed value; and control operation of the fan using the current rotating speed value to dissipate heat from the laser projection equipment.

6. The apparatus according to claim 5, wherein the first preset rotating speed information comprises: an ambient temperature range and a rotating speed level associated with the ambient temperature range, wherein the rotating speed level is associated with a predefined rotating speed value of at least one fan; and
   the processor is configured to determine the first rotating speed value of the fan of the laser projection equipment according to the ambient temperature and first preset rotating speed information, comprising:
   determine, according to the ambient temperature and the first preset rotating speed information, an ambient temperature range to which the ambient temperature belongs, and obtain a rotating speed level associated with the ambient temperature range to which the ambient temperature belongs; and
   obtain, according to the obtained rotating speed level, the first rotating speed value associated with the obtained rotating speed level for at least one fan of the laser projection equipment.

7. The apparatus according to claim 5, wherein the processor is further configured to:
   obtain a heat source temperature of the laser projection equipment at a predefined period;
   when the heat source temperature is above a predefined rotating speed increasing temperature, increase the rotating speed of the fan according to second preset rotating speed information and the current rotating speed value; obtain an adjusted rotating speed value; and take the adjusted rotating speed value as the current rotating speed value;
   or when the heat source temperature is below a predefined rotating speed decreasing temperature, decrease the rotating speed of the fan according to the second preset rotating speed information and the current rotating speed value; obtain an adjusted rotating speed value; and take the adjusted rotating speed value as the current rotating speed value.

8. The apparatus according to claim 7, wherein:
the second preset rotating speed information comprises:
multiple rotating speed levels, and predefined rotating speed values of multiple fans associated with each rotating speed level.

* * * * *